May 19, 1936.　　　　A. SCHWIERS　　　　2,041,495
FILTER
Filed Jan. 4, 1933
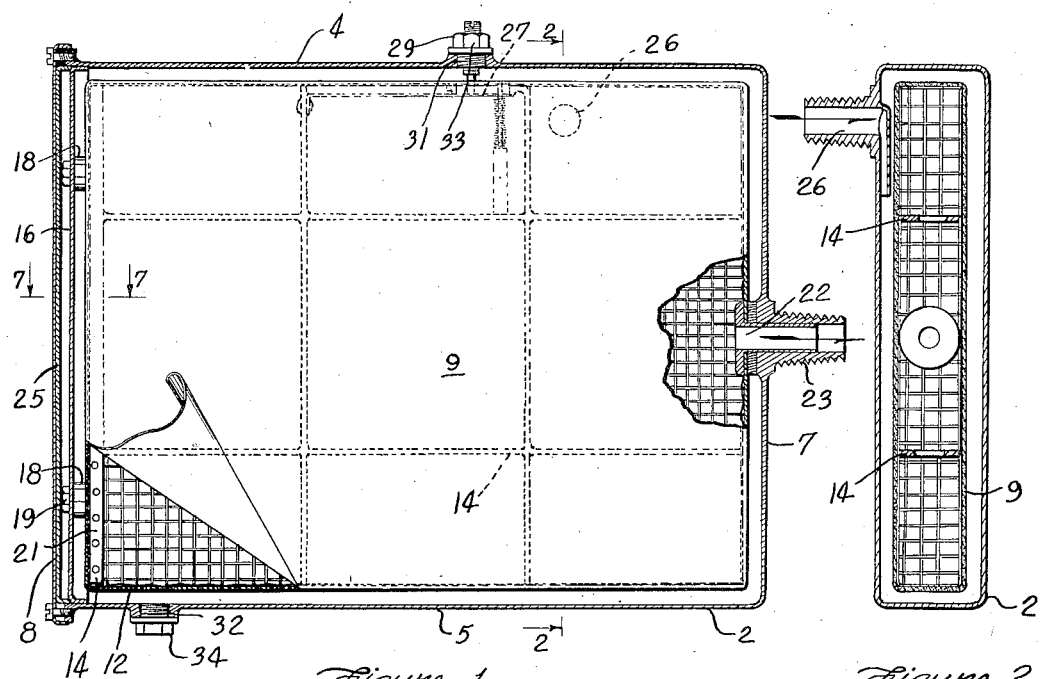
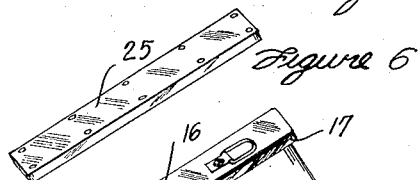
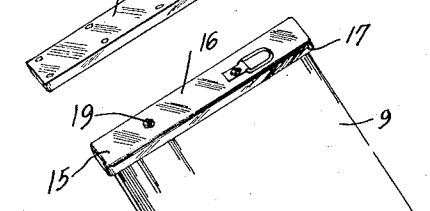
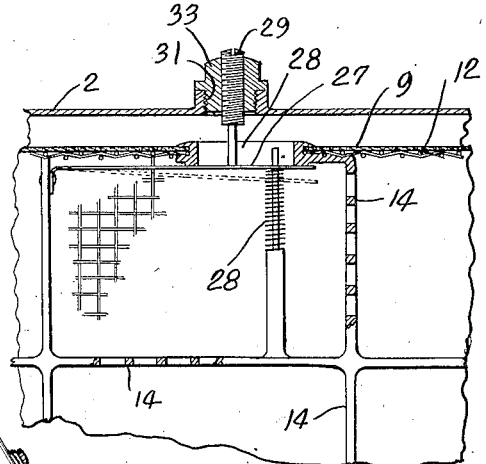
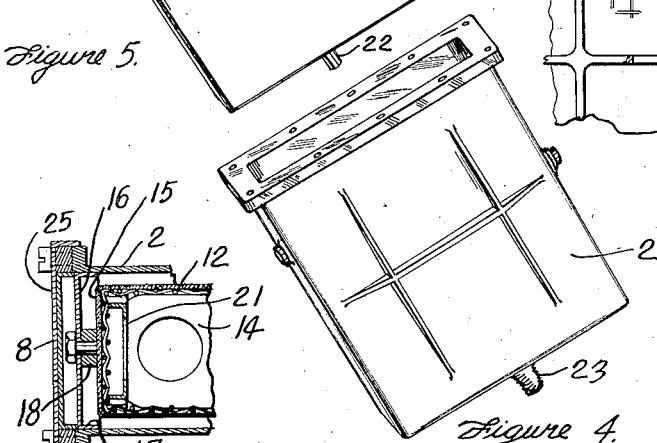
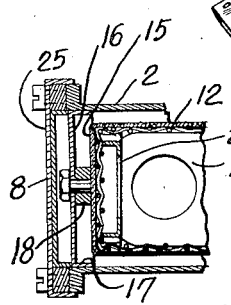
INVENTOR.
Alois Schwiers
BY Joseph B. Gardner
ATTORNEY Patented May 19, 1936

2,041,495

UNITED STATES PATENT OFFICE 2,041,495

FILTER

Alois Schwiers, Oakland, Calif.

Application January 4, 1933, Serial No. 650,105

2 Claims. (Cl. 210—181)

The invention relates to filters, such as used on automobiles and the like, for the purpose of extracting sediment and impurities from the oil being pumped to the engine.

An object of the invention is to provide an oil filter of the character described in which the oil is so directed through the filter that without impairing the free and easy circulation of the oil, the impurities will be effectively removed from the oil and will be deposited in such manner as to render removal of the latter from the filter a very simple matter and one not requiring dismounting of the filter from the vehicle.

Another object of the invention is to provide in an oil filter of the character described, a means for causing an auxiliary flow of oil therethrough in the event that a normal quantity of oil is prevented from flowing through the oil filtering medium.

A further object of the invention is to provide an oil filter of the character described, wherein the complete filtering unit may be removed from the filter casing for cleaning purposes without necessitating the disturbance of the filter mounting or any connection between the filter and engine oil-system.

A still further object of the invention is to provide a filter having a removable filtering element and is so designed that on insertion of the element into the filter body, a direct communication will be automatically established between the interior of the filtering unit and the filter outlet connection.

Yet a further object of the invention is to provide a filter of the character described, in which an effective and unobstructed filtering area is provided opposite every portion of the inner surface of the filter casing.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a vertical sectional view of the filter with parts shown in full.

Figure 2 is a cross sectional view of the filter taken on the line 2—2 of Figure 1.

Figure 3 is an enlarged fragmentary sectional view of the filter, similar to Figure 1.

Figures 4, 5 and 6 are perspective views of the filter casing, filtering element, and filter casing cover, respectively.

Figure 7 is an enlarged fragmentary sectional view of the filter taken on the line 7—7 of Figure 1.

As illustrated in the drawing, the filter of my invention comprises an outer casing 2 here shown of generally rectangular form and having side walls 3 of relatively large area and in close opposed relation. Top and bottom side-walls 4 and 5, and an end wall 7, are provided for the casing and are of relatively narrow width so that there is defined within the casing a space with considerable linear dimension in two directions but very small dimension in the third direction.

One end 8 of the casing is left open and allows of the insertion into or withdrawal from the casing of a filter element 9. The latter is of approximately the same form as the casing but is sufficiently smaller to permit the element when contained in the casing to lie spaced therefrom on all sides. The element is in the form of a closed shell 12 constructed of wire screen or other open framework and completely enclosed in a covering of cloth or like material suitable as a filtering medium. Within the screen frame are a plurality of cross members 14 which serve as a reenforcement for the former and are perforated so as to avoid obstructing the passage of oil.

The element is supported in the casing in a rather novel manner. At the end 15 of the element arranged to lie near the open end of the casing is an end plate 16 having flanged edges 17 which fit against the inner surface of all four sides of the casing. The various sides of the element are spaced inwardly from the edges 17 so that when the plate is operatively held in the casing the opposing sides of the element and casing will be correspondingly spaced apart. Spacing of the end 17 from the plate is afforded by means of washers 18 through which extend the screws 19 or the like for securing the plate and element together. As a means of reenforcing the end 15 of the element, a perforated bar or channel member 21 is fixed within the screen at said end. Support of the element in proper spaced relation at the inner end is afforded through means of a pipe 22 which leads from the interior of the element and is slidably inserted in a discharge connection 23 extending outwardly from the casing. Engagement or disengagement of the pipes 22 and 23 is effected on insertion into or withdrawal of the element from the casing. A closure 25 removably secured in position is provided for closing and sealing the open end of the casing.

Intake of oil to the filter is by way of an inlet pipe 26 which leads to the space between opposing sides of the casing and element whereby oil entering the filter may be distributed completely around the element, the entire exterior surface of which is, as before explained, available for filtering purposes.

Since, as will now be quite clear, the flow of oil through the filter is from the outside to the inside of the element, all the dirt and impurities from the oil will be deposited and collected on the outer side of the cloth. In this manner whenever it is desired to clean the filter, it is merely necessary to remove the filter element from the casing and wash off the impurities from the cloth with a liquid solvent, or the like, it being unnecessary to detach the cloth from the element or in any way disturb the mounting of the filter or the connection of the filter in the oil line. After the dirt and impurities have been removed, the element and cover may be readily replaced to render the filter again operative.

If desired, a substantial cleaning of the element may be effected by flushing the filter with a solvent without removing the element from the casing. For this purpose there are provided at the top and bottom of the casing, an inlet opening 31 and a drain opening 32, through which the solvent may be respectively introduced and withdrawn from the casing, suitable plugs 33 and 34 being provided for closing said openings.

It will be clear that the normal course of the oil through the filter after entering the casing is through the filter cloth and screen into the interior chamber of the element, from whence it passes directly to the exterior of the filter through pipes 22 and 23. Should, however, the oil be prevented for any reason from passing through the filtering cloth into the interior of the element for discharge through the said pipes, as soon as a sufficient pressure is built up in the casing, a safety valve 27 provided in a wall of the element is caused to open whereby the oil may pass directly into the element through an opening 28 in said wall. The valve 27 is preferably formed of a spring material and so arranged as to be urged to assume a closed position. However, if desired an auxiliary spring 28 may be used to assist the valve in closing. Ordinarily, in order to insure a flow of oil, even when relatively cold as in starting the engine, the valve 27 is held in a partially open position, such as by means of an adjustable setting device 29. Thus at all times a stream of oil is permitted to circulate through the filter independent of what is arranged to flow through the filtering medium, and as a result there will be no danger of a lack of flow of oil to the engine.

I claim:

1. In a filter of the character described, a casing having a pair of opposite side walls in close proximity, a filtering element removably positioned within the casing, means carried by the element for supporting same with substantially all exterior portions thereof in close spaced relation to the inner surface of the casing, said element comprising a frame of open mesh material, a covering of filtering material completely enclosing and supported on said frame, valve means adjustable from the exterior of said casing affording a passage of variable area from the space around the element to the interior thereof, a means of admission of fluid to said space from the exterior of said casing, a means affording a passage for fluid from the interior of the element to directly without the casing.

2. A filter comprising, an outer casing, a hollow filtering element disposed therein with the sides thereof spaced from the sides of said casing, inlet and discharge means communicating with the space between the filtering element and the outer casing and with the interior of said element for providing a flow of fluid to be filtered through said element, valve means pressure responsive permitting a bypassing of fluid of said element, and a valve stem threadably carried in the outer casing and engageable at the exterior thereof for initially opening said valve while at the same time permitting further opening in accordance with the fluid pressure in the filter.

ALOIS SCHWIERS.